(12) United States Patent
Nerone et al.

(10) Patent No.: US 6,373,200 B1
(45) Date of Patent: Apr. 16, 2002

(54) INTERFACE CIRCUIT AND METHOD

(75) Inventors: Louis R. Nerone, Brecksville; Laszlo S. Ilyes, Richmond Heights, both of OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/630,303

(22) Filed: Jul. 31, 2000

(51) Int. Cl.[7] .................................................. G05F 1/00
(52) U.S. Cl. ........................ 315/291; 315/225; 315/294; 315/324
(58) Field of Search ................................. 315/291, 225, 315/294, 324, 8

(56) References Cited

U.S. PATENT DOCUMENTS

| | | | |
|---|---|---|---|
| 4,350,935 A | * 9/1982 | Spira et al. .................. | 315/291 |
| 5,559,395 A | 9/1996 | Venkitasubrahmanian et al. .......................... | 315/247 |
| 5,583,402 A | * 12/1996 | Moisin et al. ............... | 315/307 |
| 5,729,096 A | * 3/1998 | Liu et al. .................... | 315/225 |
| 5,751,118 A | * 5/1998 | Mortimer .................... | 315/291 |
| 5,818,669 A | * 10/1998 | Mader ......................... | 361/18 |
| 5,841,239 A | 11/1998 | Sullivan et al. ............. | 315/219 |
| 5,994,848 A | 11/1999 | Janczak ....................... | 315/224 |
| 6,204,613 B1 | * 3/2001 | Hesterman .................. | 315/291 |

* cited by examiner

Primary Examiner—Don Wong
Assistant Examiner—Jimmy T Vu
(74) Attorney, Agent, or Firm—Fay, Sharpe, Fagan, Minnich & McKee, LLP

(57) ABSTRACT

An interface circuit 10 for coupling a power supply 12 that includes a triac phase modulator 18 with a compact fluorescent lamp converter and lamp load 14. The circuit 10 rectifies the modulated power supply signal with a rectifier 24. A current flowing through a current limiting inductor 112 goes through either a reverse current blocking diode 114 to power the fluorescent lamp or through a transistor 116 to reset/discharge the triac phase modulator 18. Transistor 116 is controlled by an R-S flip-flop. The reset 120 of the R-S flip-flop is connected through a current threshold sensor formed by a pair of resistors 144, 146 and a transistor 142. A high duty cycle oscillator is connected to the set 124 of the R-S flip-flop. Large current variations in the triac phase modulator 18 are prevented by current flowing through transistor 116 when the current no longer flows through the diode 114.

20 Claims, 5 Drawing Sheets

INTERFACE CIRCUIT AND METHOD

BACKGROUND OF THE INVENTION

This invention relates to an interface circuit, and, more particularly, to an interface circuit to couple a modulated power supply with a fluorescent lamp system, and, even more particularly, to an interface circuit to couple a triac modulated power supply with a compact fluorescent lamp system.

Fluorescent lamps are used both at the office and at home to provide lighting. The fluorescent lamps are typically part of a fluorescent lamp system, which usually includes a converter, and are powered by a power supply such as a conventional 100–120 VAC line source. Power from the line source is provided to the inverter which provides power input at a suitable frequency to the fluorescent lamp. To provide a dimming capability, the power from the line source may be modulated by a modulator, such as a triac phase modulator.

Triac phase modulators typically are used to modulate power provided to resistive loads. However, there may be incompatibility between a triac phase modulator and a capacitive load which is provided with modulated power from such modulator, for example, due to the existence of continuing currents and/or stored voltages when the triac phase modulator is supposed to switch from one conductive state to the other. The result of such incompatibility can stress the triac, the control or gate circuit therefor, or both, which may degrade the operation and longevity of the triac phase modulator circuit and/or capacitive load, for example, a fluorescent lamp system.

Interface circuits have been used to control voltages and currents that occur while power is transferred from such a modulated power supply to the fluorescent lamp system. However, conventional interface circuits have failed to fully compensate for the capacitive nature of the fluorescent lamp system, and do not fully compensate for the rapidly changing voltages and currents that can electrically stress or fatigue various elements of a triac phase modulator and interface circuit. Thus, this sometimes results in premature failures of the modulator, interface circuit and/or fluorescent lamp system. An example of such an interface circuit is presented in U.S. Pat. No. 5,994,848 to Janczak, which discloses an interface circuit connected between a triac dimmer and a compact fluorescent lamp.

Accordingly, there is a need in the art for an interface circuit to provide compatibility between a triac phase modulator and a fluorescent lamp, for example a compact fluorescent lamp.

BRIEF SUMMARY OF THE INVENTION

Thus there is a particular need for an interface circuit for coupling a modulated power supply to a capacitive load including a switching element coupled to the modulated power supply to selectively provide a current path, and a threshold sensing element coupled to the switching element to determine when a threshold is exceeded such that the threshold sensing element controls when the switching element provides the current path.

Thus there is a particular need for an interface circuit including a means for voltage rectifying a modulated power supply, a means for switching, coupled to the means for voltage rectifying; and a means for threshold sensing, coupled to the means for switching.

Thus there is a particular need for a method of coupling a modulated power supply with a capacitive light source load including selectively coupling the modulated power supply to a capacitive light source load, a sensing element coupled to the modulated power supply to determine if a threshold current through the sensing element is exceeded, and discharging at least one charged element when the threshold is not exceeded.

DETAILED DESCRIPTION OF THE INVENTION

Figure 1:
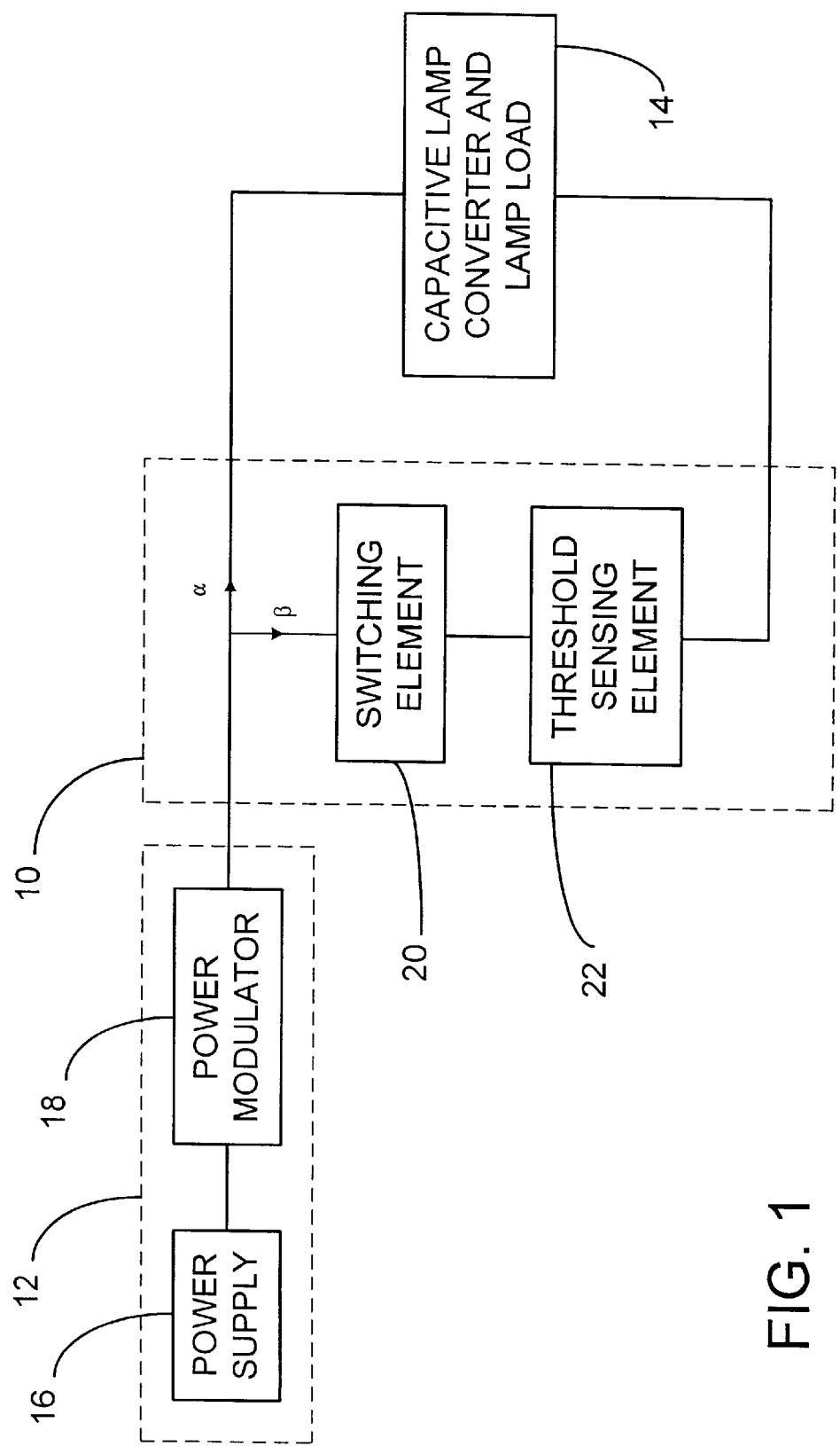
FIG. 1 is a block diagram of an interface circuit of the present invention coupled to a modulated power supply and a capacitive lamp load.

Referring now to the drawings in which like reference numerals designate like parts in the several figures, and initially to the block diagram of FIG. 1, an interface circuit 10 is coupled between a modulated power supply 12 and a capacitive lamp converter and lamp load 14 such as an LPF CFL system. The modulated power supply 12 includes an AC power supply 16 having a regular cycle, e.g., 50 Hz–60 Hz; and a power modulator 18. As is described in greater detail below, an exemplary power modulator 18 is a triac device which provides phase modulated switching, and the interface circuit 10 has features to improve the compatibility of the power modulator 18 and the capacitive load 14.

The interface circuit 10 includes a switching element 20 and a threshold sensing element 22 which cooperate to allow current to continue to be drawn from the modulated power supply 12 during that portion of a half cycle of the power supply 16 during which current is not being drawn from the modulated power supply 12 by the capacitive load 14. Current is provided by the modulated power supply 12 to the load 14 via current path α a or to an alternative current path β that includes the switching element 20. If the switching element 20 did not provide the alternative path, the current would suddenly have to stop flowing from the modulated power supply 12 once power was no longer being coupled to the capacitive lamp converter and lamp load 14. The large current variations associated with suddenly turning off current causes electrical stress or fatigue to the components in the power modulator 18. Therefore, the interface circuit 10 provides for continuation of current flow from the modulated power supply 12 to mitigate electrical stress in the power modulator 18, while consuming a minimal amount of power.

In operation, the switching element 20 is operative, e.g., it turns on, in response to the threshold sensing element 22 sensing that power has stopped being transferred to the capacitive lamp converter and lamp load 14 from the modulated power supply 12. The threshold sensing element 22 senses that power has stopped being transferred by detecting, for example, that a current through a resistor is not equal to or above a certain threshold value. In carrying out its function the switching element 20 provides an alternate path β for the current flowing from the power modulator 18 once power stops being transferred from the power modulator 18 to the capacitive lamp converter and lamp load 14. The alternative path β prevents sudden and large variations in the current drawn from the power modulator 18. Thus, the switching element 20 adjusts or regulates the current drawn by the interface circuit 10/load 14 combination to maintain triac current.

Power is transferred to the load 14 along current path α when larger voltages are supplied to the rectifier 24 from the modulated power supply 12. When power is not transferred to the load 14 along current path α, an alternate current path β is provided. This alternate current path β is provided when the modulated power supply 12 is at lower voltages. If the power supply 16 is sinusoidal or gradually decreasing, the alternate path β will be provided prior to the zero crossing (Zero crossings occur where the polarity of the voltage of the power supply 16 changes from one polarity to the other.). This helps to ensure the proper function of the power modulator 18 by allowing the power modulator 18 and other elements to discharge, if necessary. Thus, the power modulator 18 starts fresh at the beginning of each cycle or half cycle because it has been able to discharge and reset.

Figure 2:
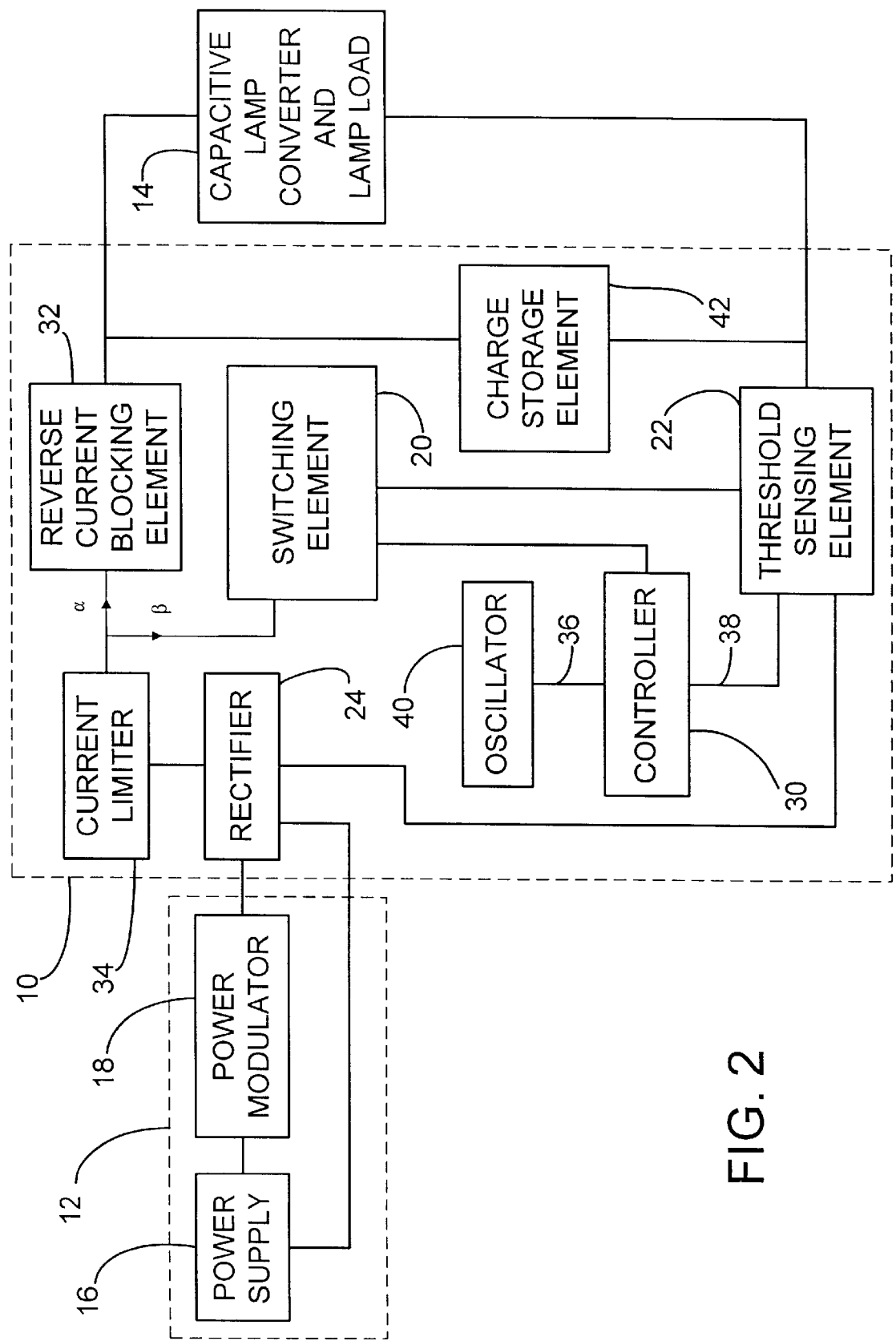
FIG. 2 is an expanded block diagram of an interface circuit of the present invention coupled to a modulated power supply and a capacitive lamp load.

FIG. 2 is an expanded block diagram illustrating an interface circuit 10 coupling the modulated power supply 12 with the capacitive lamp converter and lamp load 14. The power supply 16 is typically a conventional 60 Hz, 110–125 VAC line power supply, or other line source (e.g., 50 Hz, 100 VAC; 50 Hz 220–240 VAC; etc.), and is connected to the power modulator 18. The power modulator 18 may be a triac phase modulator, a solid state switch, a photo-controlled switch, a phase modulator, an on/off modulator, solid state relay or some other modulator. An exemplary illustrated modulator 18 is a triac 26 or other device used to adjust the energization and/or light amplitude (intensity) of the light source of the capacitive lamp converter and lamp load 14 by phase modulation switching techniques (sometimes referred to as pulse width modulation). For example, the triac 26 turns on at or some time after the beginning of each half cycle of the AC signal from the power supply 16. The time in each half cycle at which the triac 26 turns on is determined by the gate control circuit 28. Typically the triac turns off each time the AC signal from the power supply crosses zero.

The present invention overcomes an example of incompatibility in prior art systems which have used a power modulator 18 that employs a switch, such as a triac 26 and an RC gate control circuit 28, to provide phase modulated (pulse width modulation) switching to control power to a capacitive load 14. As was indicated above, the triac 26 typically would be expected to turn off when the capacitor current goes to zero during each half wave cycle of the AC input power from the power supply 16. However, in prior art systems, the current flow through the triac 26 would be stopped prior to such zero crossing of the AC input power from the power supply 16 due to the current blocking effect of the reverse current blocking element 32; and, therefore, charge may remain on the capacitor in the RC gate control circuit 28 during and after such zero crossing, which would detrimentally affect reliable switching operation of the triac 26.

Accordingly, the interface circuit 10 selectively provides one of two current paths for current from the power supply 12. A first current path α couples power to the capacitive lamp converter and lamp load 14 and a second current path β discharges charged elements, such as, for example, the RC gate control 28, that need to discharge when power is not being coupled to the capacitive lamp converter and lamp load 14. The second current path β is selectively provided by allowing current to flow through the switching element 20. The discharge of charged elements helps to ensure that the power modulator 18 will continue to operate in a periodic manner. Additionally, the second current path β prevents currents and voltages in the power modulator from rapidly changing by providing an alternative current path when power stops being coupled into the capacitive lamp converter and lamp load 14.

Current flows through the switching element 20 from the power supply 12, a rectifier 24 and a current limiter 34 when current cannot be drawn by the capacitive load 14 due to the current blocking effect of a reverse current blocking element 32. However, when the current can flow through the reverse current blocking element 32 such current flow results in coupling of power to the capacitive lamp converter and lamp load 14. Thus, there are two current paths α and β along which current from the power supply 12 may flow. Power is coupled to the capacitive lamp converter and lamp load 14 when the current flows through the reverse current blocking element 32 (current path α); and when the reverse current blocking element blocks current flow, the current flows through the switching element 20 (current path β) so as to discharge any charged elements and to protect the power modulator 18 from large variations in the amount of current flowing therethrough.

The switching element 20 is controlled by a controller 30. The controller 30 selects the conductive state of the switching element 20 according to two inputs 36, 38. The first input 36 is from an oscillator 40 that has a very high duty cycle (e.g., in one embodiment, a high state occurs in greater than 90% of a 60 Hz cycle), and the second input 38 is from the threshold sensing element 22. In an exemplary embodiment, the first input signal provided by the oscillator 40 to the controller 30 repeatedly changes from a high state to a low state, and may, according to the logic of the controller and the state of the second input, cause the switching element 20 to turn on or off. However, in one exemplary embodiment, when the threshold of the threshold sensing element 22 is exceeded, the switching element 20 is turned off and remains off for as long as the threshold of the threshold sensing element is exceeded. Also, in another exemplary embodiment described below, a prescribed signal on the second input 38 to the controller 30 indicating the threshold, as sensed by the threshold sensing element 22, has been exceeded, will prevent the controller 30 from turning on the switching element 20 but does not turn off the switching element 20. The function of the controller 30 is described below in greater detail.

In one embodiment of interface circuit 10 as is illustrated in FIG. 2, the controller 30 is a flip-flop, a microprocessor, or the like, which has a first input, or set input, and a second input, or reset input. Examples of suitable flip-flops include R-S flip-flops, J-K flip-flops, or any other flip-flop which have a set and reset. The set input of the controller 30 is connected to the oscillator 40 and the reset input of the controller 30 is connected to the threshold sensing element 22.

In the interface circuit 10 of FIG. 2, as is described in greater detail below with respect to the schematic circuits of FIGS. 3 and 7, due to the current blocking effect of the reverse current blocking element 32, when current flows from the modulated power supply 12 but power is not being coupled from the power supply 12 to the load 14, current can flow through the switching element 20. Current from the modulated power supply 12 flows through switching element 20 during the initial period of time after power stops being coupled between the modulated power supply 12 and the load 14 and will continue until this current exceeds a threshold that is sensed by the threshold sending element 22. This initial period of time is when large current variations will occur that cause stress in the power modulator 18 if an alternative current path via switching element 20 were not provided. Large current variations would normally occur during this initial period of time and cause stress in the power modulator 18. However, this does not occur because an alternative current path β is provided via switching element 20.

The threshold sensing element 22 determines when to provide the alternative current path. When the current sensed by the threshold sensing element 22 does not equal or exceed the threshold, the controller 30 will turn the switching element 20 on within one oscillation of the oscillator 40. Once the switching element 20 is turned on, it will remain on until the current sensed by the threshold sensing element 22 senses that the current equals or exceeds the threshold. When the current sensed by the threshold sensing element 22 does equal or exceed the threshold, the controller 30 will turn the switching element 20 off. However, in one embodiment, the switching element 20 will be periodically turned on while the current threshold is equaled or exceeded in response to the oscillator 40 being in a low state.

The threshold sensing element 22 senses current by detecting the voltage drop across an element, e.g., a resistor, and determining if that voltage corresponds to a current equals or exceeds the current threshold. This determination can be achieved with a comparator or by using an inherent threshold voltage in an element such as the gate threshold voltage of a transistor.

When the power supplied through power modulator 18 is coupled to the load 14 by charging a charge storage element 42, there is no need for an alternative current path β and the switch element 20 is off. However, there is a need for the alternative current path β when the power supplied through power modulator 18 is no longer charging the charge storage element 42. When power is not being coupled to the load 14, reverse current blocking element 32 disconnects the interface circuit 10 from the charge storage element 42 to prevent the charge storage element 42 from discharging by becoming non-conductive. Since no current can now flow through the reverse current blocking element, the current sensed by threshold sensing element 22 will drop below the threshold value and cause the controller 30 to turn on the switching element 20 to provide the alternative current path β. The alternative current path β allows the current that had been charging the charge storage element 42 to continue to flow thereby preventing a sudden and large variation in current that would otherwise electrically stress the power modulator 18.

The flow of current through the switching element 20 discharges any charged elements that need to be discharged, such as, for example, the gate control 28, thereby ensuring that the power modulator 18 will operate properly, e.g., to maintain a desired waveform output. For example, if there were initially charged elements that should be discharged at the beginning of a waveform cycle from the power supply 16, the power modulator 18 may behave erratically. However, if the circuit elements are provided with an alternate current path allowing them to discharge, there will be no initially charged elements at the beginning of a cycle that can disrupt the desired waveform. The power that is discharged can either flow to ground, dissipate as resistive losses, and/or may be absorbed and stored in the current limiter 34. Energy stored in the current limiter 34 is later transferred to the load 14 which will improve the energy efficiency of the interface circuit 10.

Figure 3:
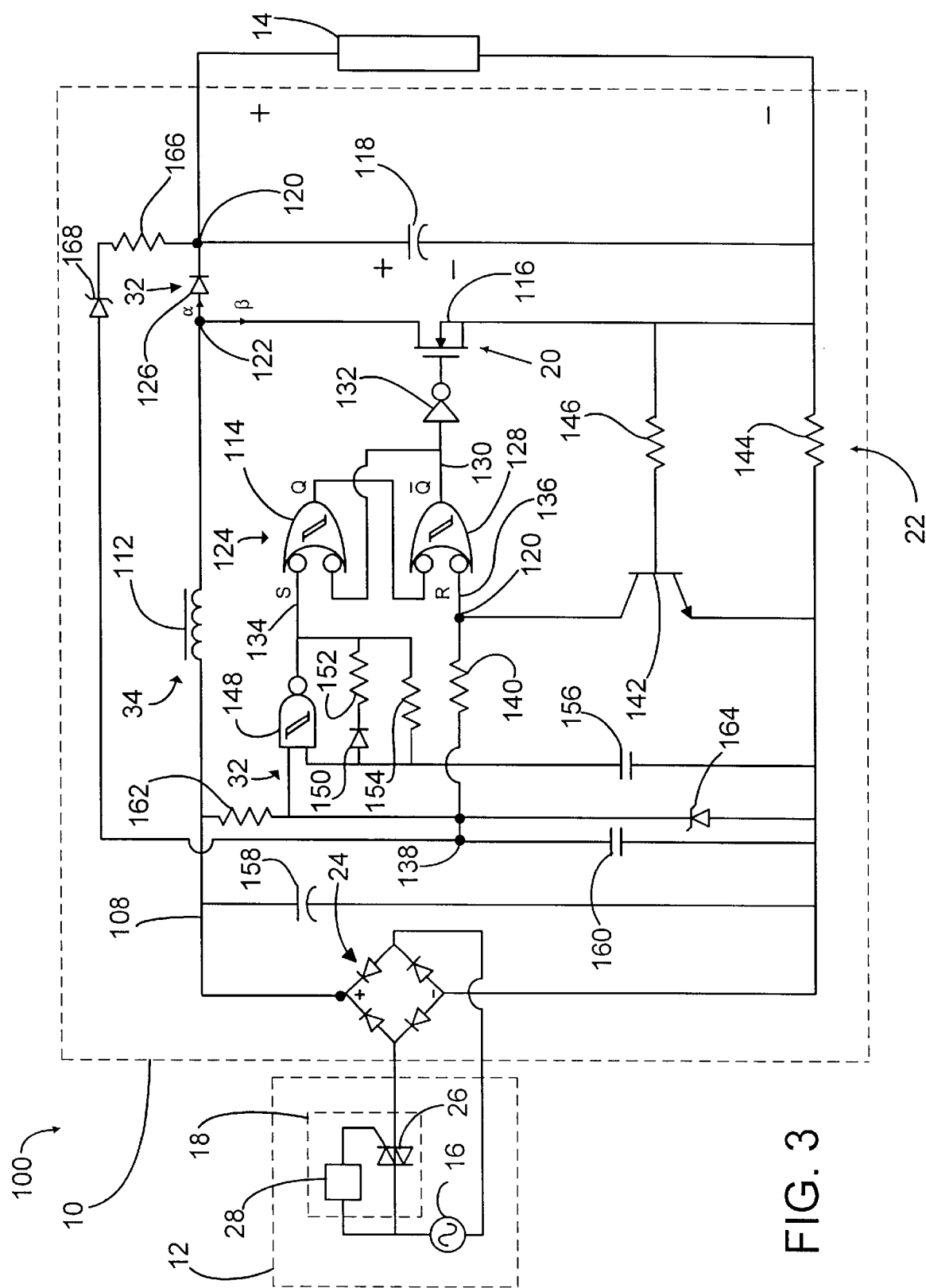
FIG. 3 is a schematic circuit diagram of a first example embodiment of an interface circuit of the present invention coupled to a modulated power supply and a capacitive lamp load.
Figure 4:
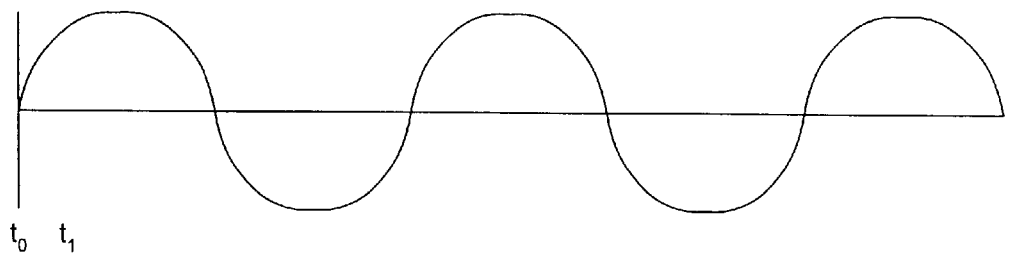
FIG. 4 is a signal timing diagram of a line source.

FIG. 3 is a schematic electric circuit diagram of an exemplary embodiment of interface circuit 10 used in an energization circuit 100 for energizing a capacitive type lamp load 14, such as a fluorescent lamp. Power input to the interface circuit 10 is supplied via a modulated power supply 12, which includes a source of line current 16 and a power modulator 18. In the embodiment illustrated in FIG. 3, the power modulator 18 is a triac 26 which has an associated gate control 28. Such triac-based power modulators 18 are known. Typically such triac-based modulators provide pulse width modulation of an input signal thereto to provide an output that is of lower average power or RMS power level than the input. In the illustrated embodiment the power supply 16 is a conventional 60 Hz line voltage source (or some other input source). An exemplary AC signal provided by the line source 16 is represented at 102 in FIG. 4. The curve 102 is a sinusoidal curve having a frequency of 60 Hz.

Figure 5:
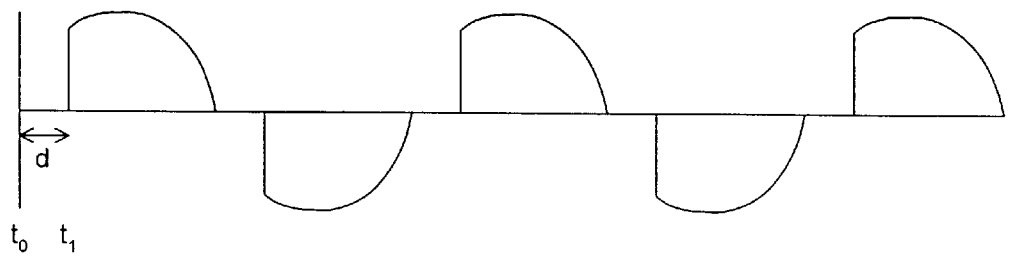
FIG. 5 is a signal timing diagram of a modulated power supply.

The signal represented by curve 102 is supplied as an input to the triac-based power modulator 18. Depending on the setting of the gate control 28, the triac 26 will fire on each half cycle of the signal 102 to supply on line 104 a pulse width modulated voltage, which is represented by curve 106 in FIG. 5. In FIG. 5 the time period d between $t_0$ and $t_1$ represents the phase delay in each half cycle of the line voltage before the triac 26 is switched to conduction, as is known. A typical gate control 28 is a resistor and capacitor circuit (RC circuit). By adjusting the time constant of such a circuit, e.g., adjusting the resistance thereof, the phase delay d shown in FIG. 5. In a typical triac-based power modulator 18 the capacitor of the gate control 28 usually is charged before or at the zero crossing of the AC input signal, for example signal 102. If the charge level of the gate control 28 is sufficiently large so as to require a significant amount of time to discharge, then accurate timing of the phase delay d cannot be assured. However, it is desirable to have such accurate timing for proper functioning of the power modulator 18 to provide a desired pulse width modulated signal on line 104 at the output thereof. The interface circuit 10 provides for such discharging of the gate control 28.

Figure 6:
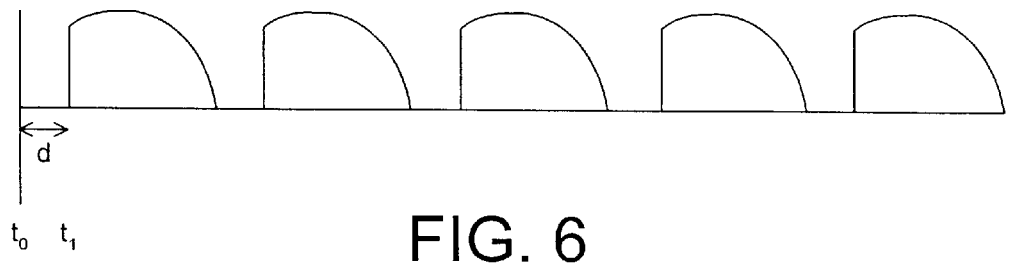
FIG. 6 is a signal timing diagram of a rectified modulated power supply.

The pulse width modulated signal on line 104 is full wave rectified by the bridge rectifier 24 to provide a positive pulse width modulated signal on line 108. The rectified pulse width modulated signal is illustrated at 110 in FIG. 6. The rectified pulse width modulated signal 110 on line 108 is current limited by the current limiter 34, here shown as an inductor 112, and is coupled either in current path a via the reverse current blocking element 32, here shown as a diode 114, to the capacitive load 14, or via the alternate current path 0 through the switching element 20, here shown as a MOSFET transistor 116.

Summarizing operation of the circuit 100 illustrated in FIG. 3, the power supply 12 and rectifier 24 provide on line 108 the full wave rectified pulse width modulated electrical power of a voltage or level that is determined by the setting of the gate control 28, for example. Considering the signal on line 108 a current, such current may flow either in current path α to charge the storage capacitor 118, or via the alternative current path β through the switch 20. The voltage stored on the storage capacitor 118 is used to operate an inverter in the lamp load 14, which in turn energizes a fluorescent lamp to produce a light output. If the voltage on the storage capacitor 118, which appears at node 120 and at the cathode of the diode 114 exceeds the voltage at the node 122 and at the anode of the diode 114, the diode 114 is reversed biased and will not conduct a current. According to the invention the switch 20 is conductive when the diode 114 is reverse biased so that current at node 122 can follow the alternative current path β. The reverse biasing of the diode 114 can occur at times when the gate control 28 in the power modulator 18 has not yet been discharged; and, therefore, conduction in the alternative current path β via the switch 20 provides a discharge path for the gate control 28 and possibly for other elements in the circuit 100 that preferably should be discharged before the next half cycle of the pulse width modulated signal on line 108 occurs. The charge on the charged elements can either be transferred to the inductor 112 or can be dissipated as resistive losses.

As was described above, operation of the switch 20 to conductive and to nonconductive states is controlled by a controller 30, and the controller 30 is responsive to inputs from an oscillator 40 and a threshold sensing element 22. As is illustrated in FIG. 3, the controller 30 is a set-reset flip-flop 124, which is formed by a pair of NAND gates 126, 128 and has at its output $\overline{Q}$ 130 coupled to an inverter 1 32. The inverter is coupled to the base or control input of the MOSFET transistor 116 (switch 20). The flip-flop 124 has a set input 134 and a reset input 136. In the embodiment described here the flip-flop 124 is a reset dominant, high true RS (reset-set) flip-flop. The reset input 136 is normally in a high state due to a logic signal input provided from a logic signal supply node 138 via a pull-up resistor 140. The high output signal on line 130 is inverted by the inverter 132 to hold off (non-conductive) the transistor switch 116.

The reset input 136 to the flip-flop 124 can be pulled to a low state when a transistor 142 of the threshold sensing element 22 is conductive. The transistor 142 is conductive when the base emitter junction thereof is forward biased. Forward biasing occurs when a current through a resistor 144 is sufficiently large so that a voltage is applied to the base of transistor 142 that equals or exceeds the voltage necessary to turn on the transistor 142. Since the voltage required to turn on transistor 142 is a non-zero voltage, the resistors 144, 146 and the transistor 142 cooperate so as to detect when the current through resistor 144 is equal to or greater than a predetermined threshold. The resistors 144, 146 are coupled to the emitter and base of the transistor 142, as is illustrated in FIG. 3. In FIG. 7 resistors 144 and 146 are used but are connected differently, as will be described further below.

The set input 134 receives an oscillating signal input, which is provided by the oscillator 40. The oscillator 40 includes a NAND gate 148, diode 150, resistors 152, 154, and a capacitor 156. The resistors 152, 154 and capacitor 156 have values selected to cause the output from the NAND gate 148, which is provided to the set input 134 of the flip-flop 124, to oscillate at a desired frequency (e.g., 50 KHz). The relative values of the resistors 152, 154 also set the duty cycle of the oscillator 40.

The control of the transistor 116 in FIG. 3 can be summarized by its truth table where a "1" indicates a high or on state, a "0" indicates a low or off state, and an "X" indicates a don't care state that retains the prior state. The S input is from the oscillator and the R input is from the threshold detection element. The R input is high when the threshold is not met or exceeded (i.e., state "1" occurs when the current through resistor 144 is below the threshold). The output is from the $\overline{Q}$ and is inverted prior to connection to the gate of transistor 116. Thus, for FIG. 3, when the threshold is met or exceeded the transistor 116 is always off and when the threshold is not met or exceeded the transistor will turn on within one cycle of the oscillator (e.g., 20 μS). Once the transistor 116 turns on, it will not turn off until the threshold is met or exceeded.

| FIG. 3 Truth Table | | | |
|---|---|---|---|
| S | R | $\overline{Q}$ | Inverted $\overline{Q}$ |
| 0 | 0 | 1 | 0 |
| 0 | 1 | 0 | 1 |
| 1 | 0 | 1 | 0 |
| 1 | 1 | X | $\overline{X}$ |

Figure 7:
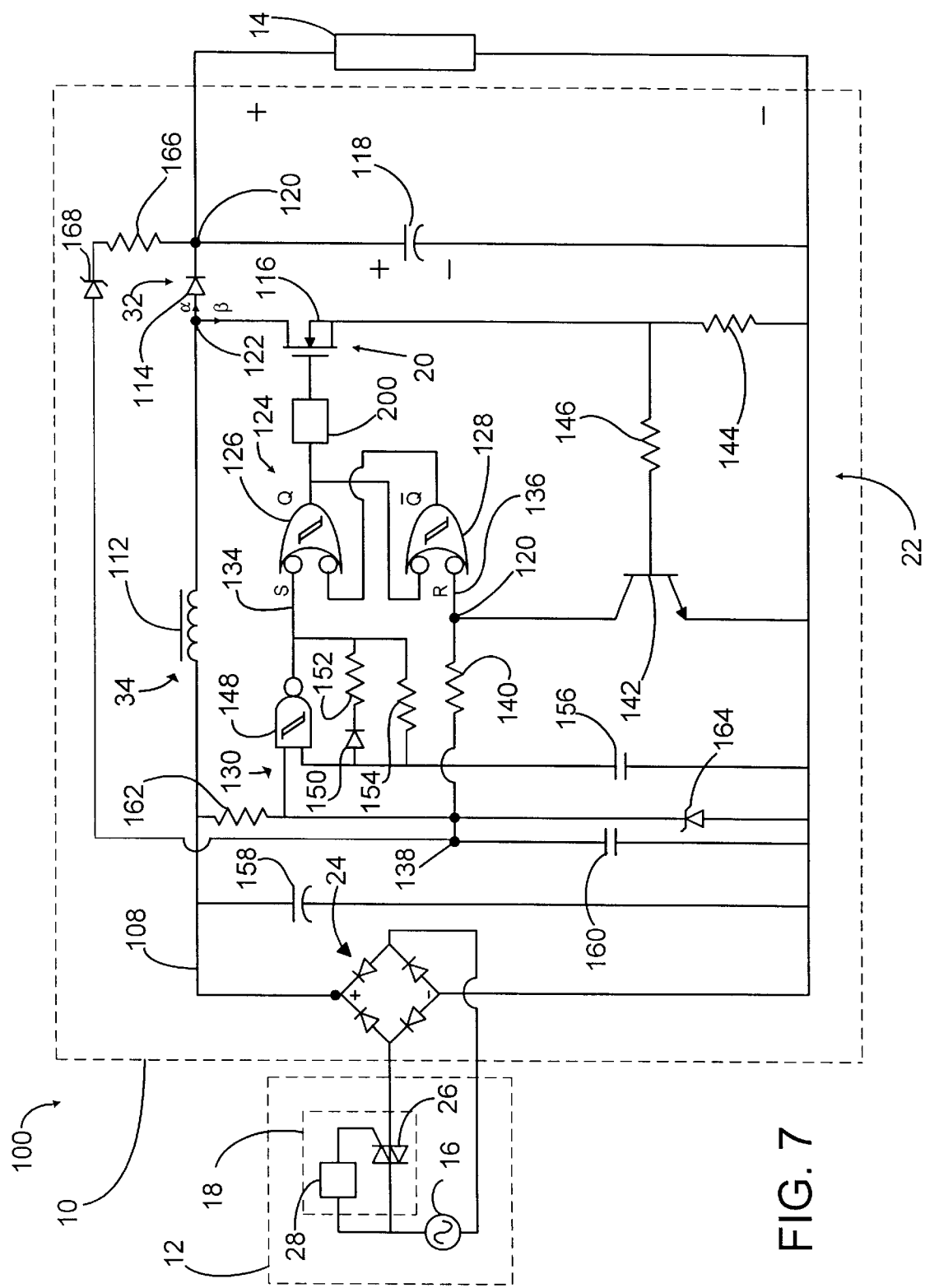
FIG. 7 is a schematic circuit diagram of a second example embodiment of an interface circuit of the present invention coupled to a modulated power supply and a capacitive lamp load.

FIG. 7 illustrates another exemplary embodiment of an interface circuit 10. FIG. 7 is the similar to FIG. 3 with the following exceptions. The inverter 132 that inverts the output of gate 128 of the flip-flop 124 is eliminated and the transistor 116 is connected to the output of the flip-flop gate 126 either directly or via an optional delay element 200. The delay element 200 may be used to compensate for propagation delays. The negative terminal of charge storage capacitor 118 is connected to a point between the transistor 142 and the resistor 144 instead of being connected to the point between the transistor 116 and the resistor 144. The remainder of FIG. 7 is identical to FIG. 3.

However, the function of the circuit of FIG. 7 is not identical to FIG. 3. The control of the transistor 116 in FIG. 7 can again be summarized by its truth table where a "1" indicates a high or on state, a "0" indicates a low or off state, and an "X" indicates a don't care state that retains the prior state. The S input is from the oscillator and the R input is from the threshold detection element. The R input is high when the threshold is not met or exceeded (i.e., state "1" occurs when the current through resistor 144 is below the threshold). The output is from the Q and not $\overline{Q}$ The Q output is coupled to the gate of transistor 116. Thus, for FIG. 7, when the oscillator is low, Q is high and the transistor is conductive. When the oscillator is high and the threshold is met or exceeded, the transistor 116 is not conductive. If the oscillator is high and the threshold is not met or exceeded, then the output of Q will remain in its prior state. Thus, compared to the embodiment of FIG. 3, this embodiment is less power efficient since transistor 11 6 periodically become conductive while capacitor 118 is charging. The very high duty cycle of the oscillator 40 signal output avoids siphoning off much of the power supplied by the charge storage capacitor 118 since the oscillator 40 only cause the transistor 116 to become conductive only for a very short period of time.

| FIG. 7 Truth Table | | |
|---|---|---|
| S | R | Q |
| 0 | 0 | 1 |
| 0 | 1 | 1 |
| 1 | 0 | 0 |
| 1 | 1 | X |

The circuit of FIG. 7, excluding the optional delay element 200, was tested and successfully coupled a commer cially available triac phase dimmer with a fixed load. The values of the interface circuit were as follows:

Inductor 112=1 mH
Capacitor 158=1 µF
Capacitor 160=1 µF
Capacitor 156=1 nF
Capacitor 118=47 µF
Resistor 162=200 KΩ
Resistor 152=3.9 KΩ
Resistor 154=100 KΩ
Resistor 140=100 KΩ
Resistor 146=100Ω
Resistor 144=3Ω
Resistor 166=100 KΩ
Zener Diode 164=10 V (1N5240B)
Zener Diode 168=120 V(1N4763A)
Diode 150=1N4148
Transistor 142=2N3904

In FIGS. 3 and 7, the logic signal supply node 138 supplies a logic supply voltage to the gates 126, 128, 148. The capacitor 160, resistor 162, and zener diode 164 help regulate voltage at the logic supply node 138. A convenient way of creating the potential at the logic supply node 138 is by serially connecting a resistor 166 and a zener diode 168 to a positive terminal of the charge storage capacitor 118. The logic supply voltage may be provided to the logic signal supply node 138 in any manner that provides a DC voltage.

An optional decoupling capacitor 158 may be applied across the positive and negative terminals of the rectifier 24 in FIGS. 3 and 7 to provide a sufficient charge reservoir to the interface circuit 10 without interfering with the power modulator 18.

One additional advantage of the interface circuit of the present invention is that only four gates are required. This enables a M 4093 quad 2 input NAND gate or similar chip that only costs about 8 cents to be used to construct the interface circuit. This renders the circuit very cost effective to manufacture.

While the invention has been described with respect to specific embodiments by way of illustration, many modifications and changes will occur to those skilled in the art. It is, therefore, to be understood that the appended claims are intended to cover all such modifications and changes as fall within the scope of the invention.

What is claimed is:

1. An interface circuit for coupling a modulated power supply to a capacitive load comprising:
   a first current path and a discharge current path;
   a switching element coupled to a threshold sensing element to determine whether the first current path or the discharge current path draws current from the modulated power supply; and
   the threshold sensing element determining a threshold value and cooperating with the switching element to control when the switching element provides either the first current path or the discharge current path, based on the threshold value.

2. The circuit according to claim 1, further comprising an oscillator coupled to a controller which provides control logic to determine when the switching element provides either the first current path or the discharge current path, based on the threshold value.

3. The circuit according to claim 2, further comprising controlling the switching element to provide the discharge current path to thereby discharge and reset elements of the circuit.

4. The circuit according to claim 3, wherein the control logic is generated by an R-S flip-flop.

5. The circuit according to claim 3, wherein the flip-flop is a reset dominant, high true flip-flop.

6. The circuit according to claim 3, wherein the oscillator has a duty cycle of greater than 90%.

7. The circuit according to claim 3, further comprising:
   a delay element connected between the switching element and the controller, the delay element compensating for propagation delays of the threshold sensing element and the control logic.

8. The circuit according to claim 1, wherein the switching element is conductive while a threshold of the threshold sensing element is not exceeded.

9. The circuit according to claim 1, wherein the switching element is a transistor.

10. The circuit according to claim 1, wherein the modulated power supply includes a triac.

11. The circuit according to claim 1, wherein the capacitive load includes a fluorescent lamp.

12. The circuit according to claim 1, further comprising a current limiter coupled to a terminal of the modulated power supply to limit the current supplied by the modulated power supply.

13. The circuit according to claim 1, wherein a power factor of the interface circuit is about 0.7.

14. An interface circuit comprising:
   a means for voltage rectifying a modulated power supply;
   a means for switching, coupled to the means for voltage rectifying; and
   a means for threshold sensing, cooperating with the means for switching wherein a first current path or a discharge current path is selectively provided by the switching means.

15. The circuit according to claim 14, further comprising:
   a means for oscillation;
   a means for providing logic control; and
   a means for discharging and resetting elements of the circuit.

16. The circuit according to claim 14, further comprising means for delaying.

17. The circuit according to claim 14, further comprising a means for current limiting.

18. The circuit according to claim 14, wherein a power factor of the circuit interface is about 0.7.

19. A method of coupling a modulated power supply with a capacitive light source load comprising:
   interfacing a switching element and a threshold sensing element;
   the switching element cooperating with the threshold sensing element to selectively provide a first current path or a discharge current path;
   selectively coupling the modulated power supply to the capacitive light source load via said first current path;
   sensing a threshold current value through the sensing element; and
   discharging at least one charged element via said discharge current path based on the threshold current value and the control logic.

20. The method of claim 19, further comprising discharging the at least one charged element through the discharge current path to thereby reset the at least one element.

* * * * *